United States Patent [19]
Rothamel et al.

[11] Patent Number: 5,959,204
[45] Date of Patent: Sep. 28, 1999

[54] METHOD AND APPARATUS FOR HOLDING IN POSITION A MOTOR VEHICLE WHEEL CLAMPED ON A BALANCING MACHINE MEASURING SPINDLE

[75] Inventors: Karl Rothamel, Seeheim-Jugenheim; Lorenz Lenhardt, Griesheim, both of Germany

[73] Assignee: Hofmann Werkstatt-Technik GmbH, Pfungstadt, Germany

[21] Appl. No.: 08/663,613

[22] Filed: Jun. 14, 1996

Related U.S. Application Data

[63] Continuation of application No. 08/330,079, Oct. 26, 1994, abandoned.

[30] Foreign Application Priority Data

Oct. 26, 1993 [DE] Germany .............................. 43 36 508

[51] Int. Cl.⁶ ................................ G01M 1/16; B60B 1/00
[52] U.S. Cl. ............................... 73/462; 73/468; 301/5.22
[58] Field of Search ............................. 73/462, 468, 487, 73/1 DV; 301/5.21, 5.22

[56] References Cited

U.S. PATENT DOCUMENTS

| | | | |
|---|---|---|---|
| 3,741,016 | 6/1973 | Hofmann | 73/462 |
| 4,046,017 | 9/1977 | Hill | 73/462 |
| 4,085,619 | 4/1978 | Shapiro et al. | 73/462 |
| 4,193,304 | 3/1980 | Hofmann | 73/462 |
| 4,480,472 | 11/1984 | Wood | 73/462 |
| 5,060,513 | 10/1991 | Rothamel | 73/462 |

FOREIGN PATENT DOCUMENTS 2 139 772  11/1984  United Kingdom ............ G01M 1/02

*Primary Examiner*—Hezron E. Williams
*Assistant Examiner*—Richard A. Moller
*Attorney, Agent, or Firm*—Cushman Darby & Cushman IP Group of Pillsbury Madison & Sutro, LLP

[57] ABSTRACT

A motor vehicle wheel balancing machine holds a motor vehicle wheel by clamping it on a balancing machine measuring spindle. After an operation to measure the unbalance of the the wheel has been preformed, a balancing weight is attached to the wheel using a sensor, and the measuring spindle is stopped with a holding brake which is activated when the sensor is activated.

10 Claims, 2 Drawing Sheets

METHOD AND APPARATUS FOR HOLDING IN POSITION A MOTOR VEHICLE WHEEL CLAMPED ON A BALANCING MACHINE MEASURING SPINDLE

This is a continuation of application Ser. No. 08/330,079, filed on Oct. 26, 1994, now abandoned.

BACKGROUND OF THE INVENTION

1. Field of the Invention

A typical form of procedure for correcting unbalance of a wheel such a motor vehicle wheel involves clamping the wheel on the measuring spindle of a balancing machine and then rotating the wheel to detect by means of suitable sensors any unbalance present in the wheel. After the unbalance measuring operation, one or more balancing weights are applied to the wheel at the respectively appropriate balance-correcting position.

2. Description of the Related Art

The Hofmann operating instructions for the Geodyna 88/88m wheel balancing machine (imprint 941214509.86D) specify the wheel is turned into the appropriate balancing position after the unbalance measuring operation, with the wheel being briefly braked in the balancing position by means of a braking pulse so as to facilitate stopping the wheel in the balancing position.

The balancing planes, that is to say the planes on the wheel in which one or more suitable balancing weights are to be applied, and the balancing diameters, that is to say the diameters on the wheel at which the one or more weights are to be applied, can be sensed by means of a suitable sensing device, for example in the form of a sensing rod or bar. The corresponding dimensions are then inputted into the electronic evaluation system of the balancing machine for calculation of the balancing weight or weights to be used, in which respect attention may be directed to U.S. Pat. No. 5,447,064 for further information in this respect. In that arrangement the balancing positions may be sensed both in the left-hand and the right-hand balancing planes.

SUMMARY OF THE INVENTION

An object of the present invention is to provide a method of holding a motor vehicle wheel which is clamped on a measuring spindle of a balancing machine in its position for balancing after an unbalance measuring operation for fixing a balancing weight at the appropriate position, such as to facilitate the operation of fitting the weight at the balancing position.

A further object of the present invention is to provide a method of holding a wheel whose unbalance has been measured in the appropriate position for fitting thereto a balancing weight, which affords a simplified operating procedure in conjunction with an accurate positional result.

Yet another object of the present invention is to provide an apparatus for holding in position a motor vehicle wheel clamped on a balancing machine measuring spindle, for fixing a balancing weight thereto, which is quick and easy to operate while giving a high degree of balancing weight fitting accuracy.

In accordance with the principles of the present invention the foregoing and other objects are achieved by a method of holding a motor vehicle wheel which is clamped on a balancing machine measuring spindle in its balancing position after an unbalance measuring operation for fixing a balancing weight at the appropriate position, wherein the balancing weight is fixed to the wheel by means of a sensing device. Upon actuation of the sensing device a holding brake is activated to stop or arrest the measuring spindle at the appropriate position.

In accordance with the invention in a further aspect thereof the foregoing and other objects are achieved by an apparatus for holding in position a motor vehicle wheel which is clamped on a balancing machine measuring spindle, comprising a holding brake for the measuring spindle, a sensing means for moving a balancing weight to the balancing position, a position monitoring means adapted to provide an electrical signal when the wheel is turned into the balancing position after an unbalance measuring operation, a condition monitoring means adapted to supply an electrical signal when the sensing means is moved out of its rest position, and an activating means connected to the position monitoring means and the condition monitoring means. The arrangement is such that the holding brake is activated by the activating means when the electrical signals from the position monitoring means and the condition monitoring means are supplied to the activating means.

As will be seen fran a preferred embodiment of the invention described in greater detail hereinafter, the holding brake is preferably activated in particular upon movement of the sensing means from a rest position thereof after the wheel is turned into the balancing position in which a balancing weight is to be suitably fitted thereto.

If first and second balancing weights are to be fitted to the vehicle wheel in first and second balancing planes thereon, first and second sensing means which are associated with respective ones of the balancing planes can be used for that purpose. In that case, the holding brake is activated separately upon actuation of each of the first and second sensing means.

It may be noted at this point that U.S. Pat. No. 5,471,874 describes sensing devices which serve both for sensing the balancing planes and the balancing radii and also for fitting balancing weights at the appropriate balancing positions which were ascertained in a measuring procedure. Sensing means of that configuration may also be used in the present invention.

Coupled with actuation of the sensing means after the wheel has been turned to the balancing position when fitting the balancing weight to the wheel at the appropriate position or plane, the spindle and therewith the wheel clamped thereon is held in the balancing position by the holding brake. Activation of the holding brake is maintained at least until the balancing weight has been applied to the balancing position by operation of the sensing means. The balancing weight or weights used are preferably in the form of adhesive weights.

The holding brake can be released again, for example, when the sensing means has been moved back into its above-mentioned rest position. It will be seen therefore that by virtue of the present invention there is no longer any need for the holding brake to be activated by actuation of a control member such as a pedal or the like in order to hold the wheel in the appropriate position for fitting of the balancing weight. Rather, the holding brake is activated automatically by actuation of the sensing means.

In order to prevent the wheel fran slipping in its clamping mounting on the balancing machine measuring spindle, which would falsify the position of the wheel in relation to the balancing position thereof, a low braking action can first be applied when the wheel is being turned into the balancing position, for example when the wheel is rotating at a speed of more than about 20 revolutions per minute, with the full braking action then being applied when the wheel comes to a halt.

As indicated above, the holding brake is actuated by an activating means connected to a position monitoring means which is operable to produce an electrical signal when the wheel has been turned into the balancing position after the unbalance measuring operation. The activating means is also connected to a condition monitoring means operable to produce an electrical signal when the sensing means is moved out of its rest position. It will be seen therefore that the holding brake is activated by the activating means when the activating means receives the two electrical signals from the position monitoring means and the condition monitoring means.

Further objects, features and advantages of the present invention will be apparent from the following description of a preferred embodiment.

DESCRIPTION OF THE PREFERRED EMBODIMENT

Figure 1:
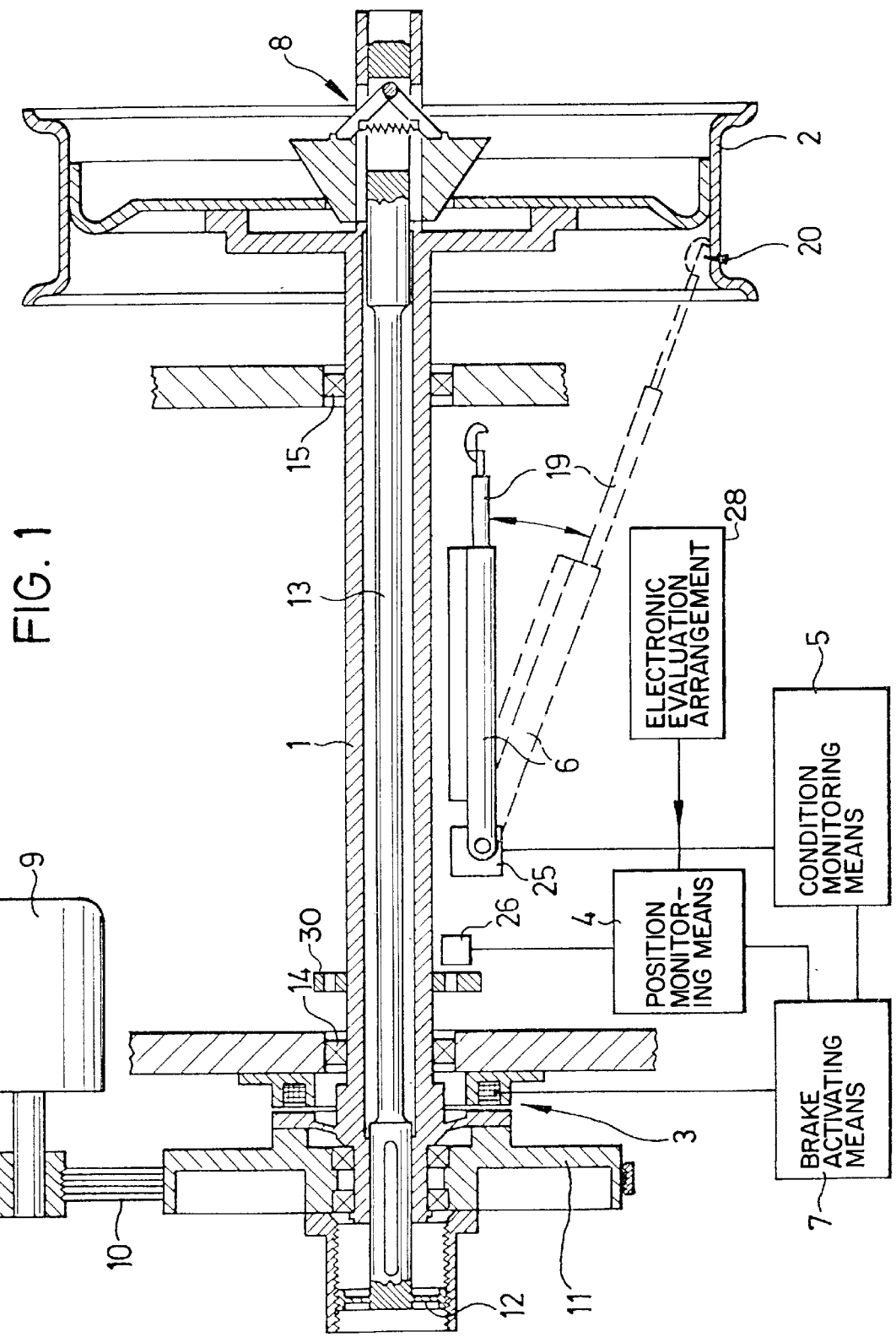
FIG. 1 is a diagrammatic view of an embodiment of the invention.

Referring generally to the drawing, in the illustrated embodiment a measuring spindle 1 is mounted rotatably in bearings 14 and 15 in the frame structure of a balancing machine. A motor vehicle wheel 2 which requires balancing is clamped on the measuring spindle 1 by means of a suitable clamping arrangement diagrammatically indicated at 8. The clamping arrangement 8 is actuated by a clamping means actuating assembly 12 by way of a pull rod 13 which extends through a bore in the measuring spindle 1. A design configuration of that kind is to be found in EP 0 550 816 A2 to which attention may therefore be directed. The measuring spindle 1 is driven at its end remote from the end at which the wheel 2 is clapped in position thereon, by means of an electric motor 9 whose torque is transmitted to the measuring spindle 1 by way of a drive belt 10 and a belt pulley 11 suitably fixed on the measuring spindle 1.

Reference numeral 3 in FIG. 1 denotes a holding brake which, is actuated by a short-duration braking pulse and is thus used as an aid for ensuring that the wheel 2 is turned into the appropriate position when the wheel 2 to be balanced is turned into the angular position for correction of any unbalance thereof by fitting one or more balancing weights.

In the illustrated embodiment the holding brake 3 also serves for more conveniently fitting one or more balancing weights, more especially in the form of adhesive weights, on the wheel 2 to be balanced, at the one or more balancing positions which are ascertained during an unbalance measuring operation. For that purpose the illustrated embodiment has a sensing means 6 which serves to sense the left-hand balancing plane on the wheel 2 and the balancing radius thereof, as is disclosed in above-mentioned U.S. Pat. No. 5,447,064. A second sensing means may also be provided for sensing the right-hand balancing plane and the associated balancing radius on the wheel 2. The second sensing means may be, for example, of the design configuration described in German patent application No P 43 30 287.4 to which attention may be directed.

Figure 2:
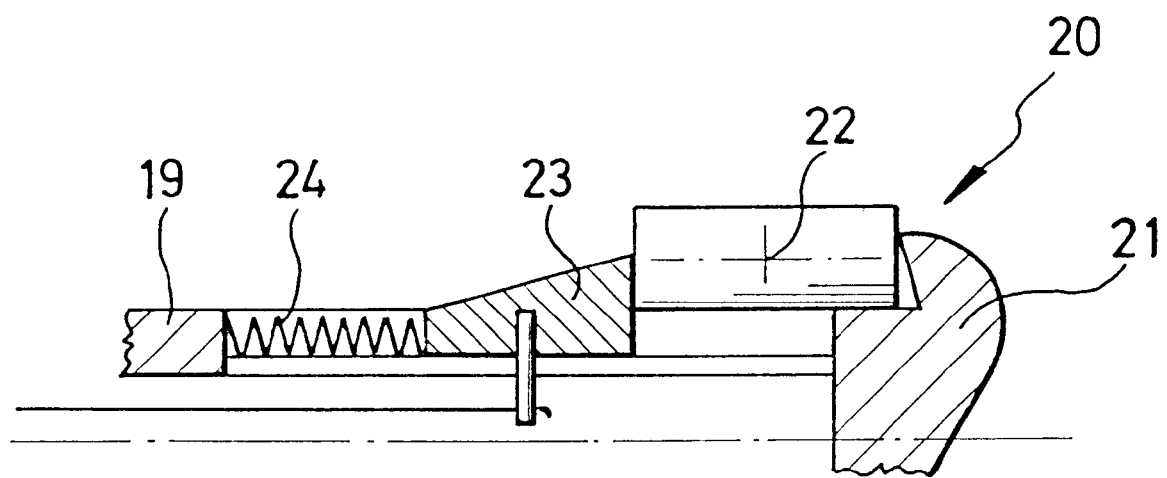
FIG. 2 is a detail view of a part of a sensing means which is used in the illustrated embodiment.

The two sensing means may be of such a configuration at their respective front ends that they can hold a balancing weight as is shown in FIG. 2 herein and as is described in above-mentioned U.S. Pat. No. 5,471,847.

Referring therefore now more specifically to FIG. 2, the front end as indicated generally at 20 of a telescopic sensing rod or bar 19 of the sensing means 6 has a sensing portion 21 for sensing possible balancing positions or locations on the wheel 2. When fitting a balancing weight as indicated at 22 in FIG. 2 the sensing portion 21 serves at the same time as a clamping member of the weight-holding device shown in FIG. 2. More specifically, a second clamping member 23 which is subjected to the force of a coil compression spring 24 urges the balancing weight 22 against the sensing portion 21, in the operation of fitting the weight in position. After the execution of an unbalance measuring operation, during which the appropriate balancing locations on the wheel 1 were ascertained by means of an electronic evaluation arrangement 28, the balancing weights, which more specifically may be in the form of adhesive weights, are fitted to the wheel 2 at the appropriate balancing positions by using the sensing means 6 and the holding device shown in FIG. 2 at the front end 20 of the sensing rod or bar 19.

In order to facilitate that operation, the spindle 1 which is mounted on the machine frame structure by the bearings 14 and 15 and the wheel 2 which is clamped fast in position on the spindle 1 are stopped and held in position by means of the holding brake 3.

For the purposes of activation of the holding brake 3, the illustrated apparatus has a brake activating means diagrammatically indicated at 7. The brake activating means 7 is actuated by a position monitoring means 4 which detects the angular position of the measuring spindle 1. For that purpose the position monitoring means 4 is connected to a sensing means diagrammatically indicated at 26 which senses an angular step generating means 30 which rotates with the measuring spindle 1 and which can be of any suitable conventional configuration, for example in the form of an apertured disk or a marking on the circumference of the spindle 1. The electronics evaluation arrangement 28 of the apparatus singles the end of the measuring operation and signals the angular position or positions in the two balancing planes to the position monitoring means 4. As soon as the spindle 1 and the wheel 2 clamped thereon, in the course of the operation of turning the wheel 2 into the appropriate position for balancing thereof, have reached a balancing angular position, the position monitoring means 4 supplies the brake activating means 7 with a signal which indicates that the wheel 2 is in the position for balancing thereof.

The illustrated apparatus also has a means for monitoring the rest position of the sensing means 6, in the form of a condition monitoring means 5. When, by way of the sensing means 25, the condition monitoring means 5 detects that the sensing means 6 has been moved out of its rest position as shown in solid lines in FIG. 1, it passes a signal to the brake activating means 7. When both the signal from the position monitoring means 4 and the signal from the condition monitoring means 5 are supplied to the brake activating means 7, the latter activates the holding brake 3 so that the spindle 1 and the wheel 2 are held fast during the operation of fitting the weight 22 to the wheel 2 at the appropriate balancing position. The same procedure is repeated in connection with the sensing means (not shown) for fitting of a balancing weight in the right-hand balancing plane on the wheel 2.

When the respective balancing weights have been fixed to the wheel 2 and the sensing means 6 has been restored to its rest position, the holding brake 3 is then released again. That can be effected by means of a suitable signal from the condition monitoring means 5.

It will be appreciated that the above-described method and apparatus according to the present invention have been set forth solely by way of example and illustration of the principles of the invention and that various modifications and alterations may be made therein without thereby departing from the spirit and scope of the invention.

What is claimed is:

1. An apparatus for balancing a motor vehicle wheel, said apparatus comprising:

a measuring spindle;

a clamp on said measuring spindle for clamping said wheel in position;

sensing means for sensing balancing planes and balancing radii of said wheel and for holding a balancing weight when said sensing means is moved to a balancing position on said wheel;

condition monitoring means for generating a condition signal when said sensing means is moved from a rest position;

position monitoring means for generating a position signal when said wheel is turned to a balancing position after an unbalance measuring operation;

actuating means, responsive to said condition signal and said position signal, for generating an electrical braking signal; and a holding brake, responsive to said electrical braking signal, for arresting rotation of said measuring spindle so that said sensing means may move the balancing weight to the balancing position.

2. The apparatus of claim 1, wherein said balancing weight is an adhesive weights.

3. The apparatus of claim 1, wherein said sensing means includes a telescoping rod.

4. The apparatus of claim 1, wherein said signal from said position measuring means is representative of an angular position of said spindle.

5. A method of balancing a motor vehicle wheel comprising the steps of:

clamping said wheel on a balancing machine measuring spindle;

sensing balancing planes and balancing radii on said wheel by a sensing means;

rotating said spindle;

conducting an unbalance measuring operation on said wheel to ascertain an angular position of a required balancing;

actuating a holding brake to prevent rotation of the measuring spindle when said wheel has reached the angular position of the required balancing and said sensing means is moved from its rest position; and affixing a balancing weight, held on said sensing means, to said wheel in said angular position of the required balancing by moving said sensing means from its rest position.

6. The method of claim 5, further comprising the steps of:

turning said wheel into a balancing position after said unbalance measuring operation has been conducted; and moving said first sensor from a rest position to an operative position;

wherein said actuating step is performed when said sensor is moved from said rest position.

7. The method of claim 5, further comprising the steps of:

applying said balancing weight to said wheel using said sensor; and releasing said holding brake to allow said spindle to resume rotation after said balancing weight is applied.

8. The method of claim 7, further comprising a step of:

returning said sensor to said rest position;

wherein said releasing step is performed after said sensor is returned to said rest position.

9. The method of claim 5, further comprising the steps of:

turning said wheel into a balancing position after said unbalance measuring operation has been conducted; and applying a low braking force to said measuring spindle with said holding brake when said wheel is turned into said balancing position.

10. The method of claim 9, wherein said applying force is performed only when said wheel is rotating faster than a predetermined speed.

\* \* \* \* \*